(12) United States Patent
Kang et al.

(10) Patent No.: US 7,709,551 B2
(45) Date of Patent: May 4, 2010

(54) COATING COMPOSITION FOR FILM WITH LOW REFRACTIVE INDEX AND FILM PREPARED THEREFROM

(75) Inventors: Jung-Won Kang, Seoul (KR); Min-Jin Ko, Daejeon (KR); Myung-Sun Moon, Daejeon (KR); Bum-Gyu Choi, Daejeon (KR); Jeong-Man Son, Gyeongju-si (KR); Dae-Ho Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 68 days.

(21) Appl. No.: 11/793,311

(22) PCT Filed: Jun. 1, 2006

(86) PCT No.: PCT/KR2006/002102
§ 371 (c)(1),
(2), (4) Date: Jun. 19, 2007

(87) PCT Pub. No.: WO2006/129973
PCT Pub. Date: Dec. 7, 2006

(65) Prior Publication Data
US 2008/0090926 A1    Apr. 17, 2008

(30) Foreign Application Priority Data
Jun. 2, 2005    (KR) .................. 10-2005-0047215
Jun. 2, 2005    (KR) .................. 10-2005-0047216

(51) Int. Cl.
*C08F 2/50*    (2006.01)
*C08F 2/46*    (2006.01)
*C08J 3/28*    (2006.01)

(52) U.S. Cl. .............. 522/83; 522/77; 522/81; 522/99; 522/104; 522/107; 522/148; 522/150; 522/153; 522/178; 522/182; 522/172; 524/858; 427/508; 427/515; 427/517; 428/411.1; 428/446; 428/447; 428/476.3

(58) Field of Classification Search .............. 522/77, 522/182, 83, 99, 104, 107, 148, 150, 153, 522/178, 172; 524/858; 428/411.1, 446, 428/447, 476.3; 427/508, 515, 517
See application file for complete search history.

(56) References Cited

U.S. PATENT DOCUMENTS

| | | | |
|---|---|---|---|
| 6,723,770 B2 | 4/2004 | Kuramoto et al. | |
| 6,924,039 B2 * | 8/2005 | Ochiai | 428/450 |
| 2003/0091839 A1 * | 5/2003 | Ochiai | 428/450 |
| 2004/0253427 A1 | 12/2004 | Yokogawa et al. | |

FOREIGN PATENT DOCUMENTS

| | | | |
|---|---|---|---|
| JP | 07133105 A | * | 5/1995 |
| JP | 2006111782 A | * | 4/2006 |
| KR | 1020050037874 A | | 4/2005 |
| WO | WO 99/10409 | | 3/1999 |
| WO | WO 03/035389 | | 5/2003 |
| WO | WO 03035780 A1 | | 5/2003 |
| WO | WO 2004/005976 A1 | | 1/2004 |
| WO | WO 2006070707 A1 | * | 7/2006 |

OTHER PUBLICATIONS

Derwent English language summary & English language machine translations of JP 2006111782.*
Derwent English language summary & English language machine translation of WO 2006070707.*
Derwent English language summary & English language machine translation of JP 07133105.*
Guangfeng Hongli Chemical Co, LTD. Product description for Quaternary Ammoniium Hydroxide (2009).*

* cited by examiner

*Primary Examiner*—Sanza L McClendon
(74) *Attorney, Agent, or Firm*—McKenna Long & Aldridge LLP

(57) ABSTRACT

The present invention relates to a coating composition for a film with low refractive index and a film prepared therefrom, and more precisely, a coating composition with low refractive index which contains dispersed porous organic/inorganic hybrid nano-particles or a colloid containing the dispersed nano-particles, a photocurable compound having unsaturated functional groups, photoinitiator or photosensitizer, or an organic siloxane thermosetting compound, and a solvent and a film prepared therefrom. According to the present invention, porous particles have been formed by using a structural regulator in a silane compound at a specific size, in order to be fitted for a film with low refractive index, and then the structural regulator has been eliminated by a simple process before forming the film, resulting in preparation of a film with extremely low refractive index at a low temperature of up to 120° C. which will be applied as a film with low refractive index or a film with low reflection for various uses including displays.

15 Claims, 1 Drawing Sheet

[Fig. 1]
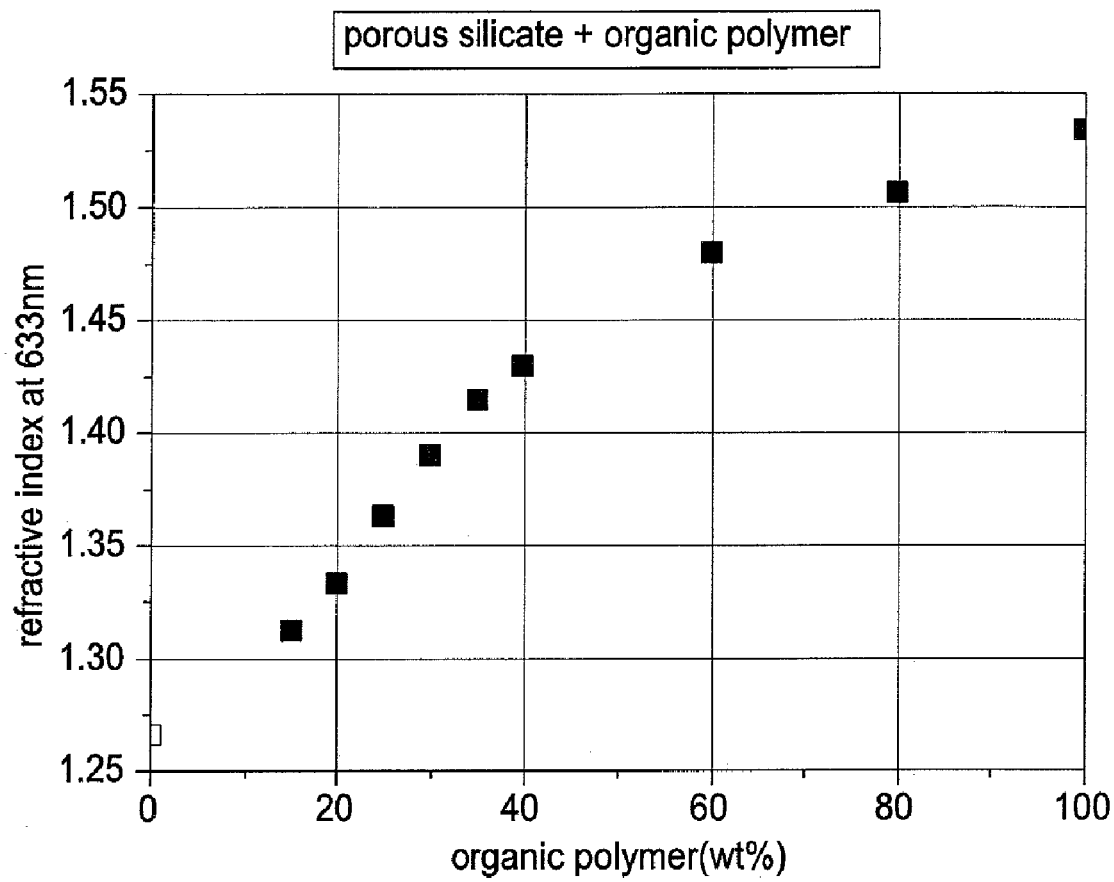
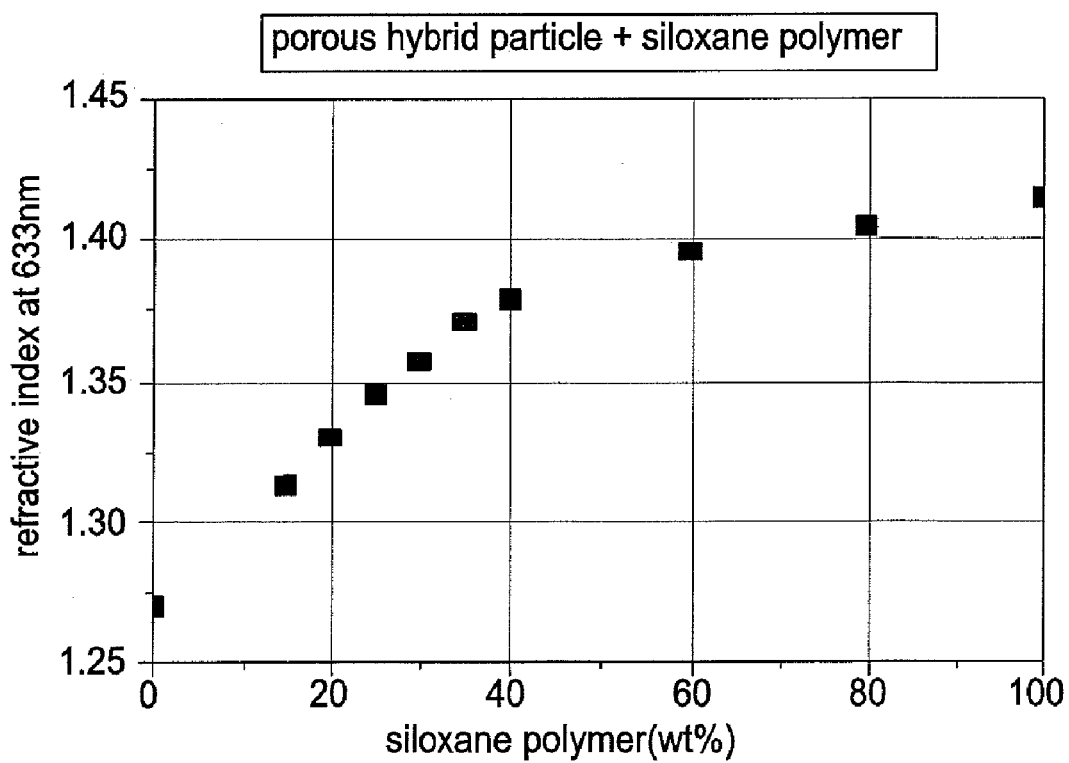

COATING COMPOSITION FOR FILM WITH LOW REFRACTIVE INDEX AND FILM PREPARED THEREFROM

This application claims priority to International Application No. PCT/KR2006/002102 filed on Jun. 1, 2006, and Korean Application Nos. 10-2005-0047215 and 10-2005-0047216, both filed on Jun. 2, 2005, all which are incorporated by reference, as if fully set forth herein.

TECHNICAL FIELD

The present invention relates to a coating composition for a film with low refractive index and a film prepared therefrom, and more precisely, a coating composition for a film with low refractive index which can be applied to photocurable film or thermosetting film. The coating composition is prepared by the process of forming porous particles by adding a structural regulator into a silane compound with a specified diameter and then eliminating the structural regulator used for forming porous particles with a simple method before film formation so as to prepare a film with an extra-low refractive index at a low temperature of up to 120° C. and a film prepared therefrom. Thus, the coating composition and the film above can be applied to a low refractive film for a variety of uses including displays.

BACKGROUND ART

Generally when we catch visual information including objects or letters from a transparent substrate or from the transparent substrate of a mirror, it is difficult to read the visual information shown on the transparent substrate because of the reflection on the surface of the substrate.

Recently, screens have become bigger and wider with the development of display techniques. So, a clearer screen display is required, arousing interest in reflection prevention. If a reflection preventing function is added to a transparent substrate, a clearer screen can be secured by preventing reflection of the exterior light.

The conventional techniques to prevent the reflection on the surface of a transparent substrate include chemical or physical vapor deposition forming a transparent metal oxide layer on the surface of a transparent substrate. Those techniques can reduce the reflection of light over a wide range and at this time the reflection preventing effect is great. However, the deposition process is not suitable for mass-production because it has shown low productivity; therefore the process is less welcomed day by day.

As an alternative, a method for preparing a reflection preventing film using a coating solution containing silica or inorganic fine particles, a composition containing fluorine organic compound with low refractive index, or a copolymer containing fluorine organic compound and/or fluorine silane compound has been proposed.

In the case of preparing a film by using a coating solution containing silica or inorganic fine particles, the film is generally prepared by mixing porous particles with binder resin. At this time, the binder resin can be one of either silicon-based thermosetting resins with low refractive index or acryl-based photocurable resins that are able to reduce curing time. To prepare porous particles according to the conventional techniques, silica is hydrolyzed and condensed by using a structural regulator, similarly to a zeolite synthesis method, and the hydrolyzed and condensed silica is treated at a high temperature of at least 400~500° C. to eliminate the structural regulator, resulting in the preparation of the porous particles. This method, however, has the disadvantages of requiring treatment at a high temperature of at least 400~500° C., difficult redispersion for film with low reflective, inconveniently huge particle size, and thereby difficulty in preparing a transparent film with low refractive index. If the heat-treatment at a high temperature of at least 400~500° C. is omitted, a structural regulator cannot be eliminated according to this method, so when the product is applied to a film with low refractive index which has to be prepared by low-heat treatment, for example a plastic substrate, the refractive index in fact increases.

To solve the above problems, an attempt has been made in which a film is formed by using silica particles containing a porous particle forming material such as a structural regulator and binder resin and then the porous particle forming material is eliminated by plasma treatment at low temperature or by dissolving it in an acid or solvent. However, plasma treatment of at least eight minutes is required to eliminate the porous particle forming material and the eliminated organic compounds become pollutants. The method of dipping a substrate in acid or solvent to eliminate the porous particle forming material also has the problem in that a wet process has to be added, making the method complicated and troublesome.

Another method for preparing porous particles is that particles are formed with aluminum and silicone and then aluminum is eliminated to form porous particles. However, this method has the problems of low yield resulting from the low silica concentration, overdose of solvent used for ultra-filtration, and prolonged manufacturing time.

In the case of using fluorine-based resin, the refractive index is reduced with the increase of the fluorine content. But, an over-dose of fluorine also causes a decrease in film adhesiveness, solubility in organic solvent, and coating properties, suggesting a limitation in lowering the refractive index.

According to the increasing demand of low dielectric materials in the semi-conductor industry, various methods have been tried to prepare an insulating film in the presence or absence of a porous particle forming material. However, all the methods are aimed at the promotion of the dielectric characteristics of a semiconductor and thus take the procedures of hardening of organic siloxane at high temperature and preparing a porous film by eliminating the organic compound at at least 350° C. That is, organic compound elimination at high temperature makes the method undesirable for the preparation of a low temperature oriented display film with low refractive index and reflection protection.

Therefore, a method is required for preparing photocurable or thermosetting film with low refractive index having excellent properties and which is characterized by easy manufacturing processes, excellent dispersibility, transparency, and low temperature processes.

To overcome the limitation of the conventional arts, the present inventors completed this invention by confirming that a film with extremely low refractive index can be prepared at a low temperature of up to 120° C. by adding a structural regulator to a silane compound for growing for further applications, and the film still maintains low reflection, dispersibility and transparency when it is mixed with silicone-based thermosetting resin or photocurable resin containing ethylenically unsaturated functional groups.

DISCLOSURE OF INVENTION

Technical Problem

It is an object of the present invention to provide a coating composition for a photocurable or thermosetting film with low refractive index and low reflection for a variety of uses, including displays, and a film prepared therefrom.

Technical Solution

To achieve the above object, the present invention provides a coating composition for a film with low refractive index characteristically containing, a) porous organic/inorganic hybrid nano-particles;
b) a photocurable compound containing unsaturated functional groups and photoinitiator or photosensitizer; or organic siloxane thermosetting compound; and
c) a solvent.

The present invention also provides a method for preparing a film with low refractive index, which is characteristically produced by the process of applying the coating composition on a substrate and hardening thereof.

The present invention further provides a film with low refractive index prepared by the above method.

BRIEF DESCRIPTION OF THE DRAWINGS

The above and other objects, features and advantages of the present invention will become apparent from the following description of preferred embodiments given in conjunction with the accompanying drawing, in which:

FIG. 1 is a graph illustrating the variations of refractive index according to the content of nano-particles.

BEST MODE FOR CARRYING OUT THE INVENTION

Hereinafter, the embodiments of the present invention will be described in detail with reference to the accompanying drawing.

The present invention confirmed that a specific composition prepared by the method of the invention, in which a structural regulator is added to a silane compound for growing to the wanted size and then the structural regulator is eliminated to prepare target particles, has excellent dispersibility and transparency compared with the compositions prepared by the conventional arts, and thus completed the invention by confirming that the method of the present invention enables the preparation of a film with extra-low refractive index at a low temperature of up to 120° C.

The coating composition for film with low refractive index of the present invention characteristically contains porous organic/inorganic hybrid nano-particles, a photocurable compound containing unsaturated functional groups and a photoinitiator or photosensitizer, or an organic siloxane thermosetting compound and solvent.

The porous organic/inorganic hybrid nano-particle of a) is a porous particle prepared by the method in which a structural regulator is added to a silane compound for growing to the wanted size and then the structural regulator is eliminated to prepare the porous particle. The preferable size of the particle is 5-30 nm and a more preferable size is 5-20 nm. If the size of the particle is less than 5 nm, the final porous organic/inorganic hybrid nano-particle product is not effective in lowering the refractive index. If the size of the particle is more than 30 nm, the final porous organic/inorganic hybrid nano-particle has the problems of poor stability and dispersibility, causing the possibility of gel formation during the production of the particle.

It is preferable for the porous organic/inorganic hybrid nano-particle to have specific composition, and especially the preferable C/Si ratio of the particle is a maximum of 0.65, which is the optimum condition for production, stability of the particle, and strength of the film. A low C/Si ratio of the porous organic/inorganic hybrid nano-particle causes the rapid increase of dielectric constant attributed to the increase of non-reacting groups in the particle, making the particle inappropriate as a low dielectric material. However, such non-reacting groups in the particle do not increase the refractive index in the film of the invention, and rather increase the strength of the particle, so it is preferable for the particle to have a low C/Si value.

The porous organic/inorganic hybrid nano-particles of a) are prepared as follows; i) a silane compound, ii) a structural regulator, iii) water, and iv) a solvent were mixed, wherein hydrolysis and condensation are induced. As a result, porous nano-particles with a 5~30□ average diameter are formed. And then, the structural regulator is eliminated from the porous nano-particles.

The silane compound of i) can be any silane compound that is composed of silicone, oxygen, carbon and hydrogen, and in particular a silane compound represented by the following Chemistry Figure 1 or Chemistry Figure 2 is preferred.

$SiR^1_1R^2_3$ <span>Chemistry Figure 1</span>

$SiR^3_4$ <span>Chemistry Figure 2</span>

In Chemistry Figure 1 or Chemistry Figure 2, $R^1$ is a non-hydrolyzable functional group which is H, F, aryl, vinyl, allyl, or un-substituted or F-substituted $C_1C_4$ straight or branched alkyl, preferably unsubstituted or F-substituted $C_1$-$C_4$ straight or branched alkyl, $R^2$ and $R^3$ are independently acetoxy, hydroxy, or $C_1$-$C_4$ straight or branched alkoxy.

In the present invention, a single silane compound or a mixture of two can be used. The maximum C/Si ratio of the silane compound of Chemistry Figure 2 for 1 mol of the silane compound of Chemistry Figure 1 is preferably 0.65 and a C/Si ratio up to 0.5 is more preferred. A higher C/Si ratio than 0.65 makes the final nano-particles unstable and reduces their properties.

The structural regulator of ii), which is one of the components of the nano-particle, can be one of the conventional structural regulators that are able to control the particle growth. Particularly, quaternary ammonium salt is preferred and an alkyl ammonium hydroxide such as tetra methyl ammonium hydroxide, tetra ethyl ammonium hydroxide, tetra propyl alkyl ammonium hydroxide, or tetra butyl ammonium hydroxide is more preferred.

The alkyl ammonium hydroxide is a structural regulator and at the same time a basic catalyst, so another basic catalyst is not necessary for the production of the porous organic/inorganic hybrid nano-particles of the present invention. However, if necessary for the regulation of pH, a different basic catalyst can be added to induce hydrolysis and condensation. At this time, the basic catalyst can be ammonia water or organic amine.

The dosage of the above structural regulator differs from the kind of structural regulator and the reaction conditions. In general, it is preferable to use the structural regulator in the amount of 0.05-0.25 mol for every 1 mol of silane compound, and 0.06-0.15 mol is more preferable. A dosage of the structural regulator of less than 0.05 causes gel formation and a dosage of more than 0.25 mol inhibits the growth of the particle, making it difficult to form a film with a low refractive index up to 1.40.

The water of iii) is used for the hydrolysis of the silane compound.

The amount of water is 0.5-10 mol for every 1 mol of the hydrolysable functional group of silane compound, and 1-5 mol of water is a more preferable amount. An amount of water less than 0.5 mol cannot satisfactorily induce hydrolysis and condensation, thereby reducing the mechanical properties of the film and not providing a low refractive index. An amount of water of more than 10 mol causes gel formation during the hydrolysis and condensation, resulting in irregular components in the reaction solution, which is not suitable for mass-production.

The solvent of iv) used for the preparation of the nano-particle is not limited specifically, as long as it does not interrupt the hydrolysis and condensation. For example, aliphatic hydrocarbon solvent, alcohol solvent, ether solvent, ester solvent or amide solvent can be used, and among these alcohol solvent is preferred.

The preferable dosage of the solvent is 0.5-20 mol for every 1 mol of the hydrolysable functional group of silane compound. A lack of the solvent, less than 0.5 mol, increases the reaction speed, resulting in gel formation. On the contrary, an overdose of the solvent, more than 20 mol, reduces the reaction speed, so that the particles do not have enough porosity upon completion of the reaction.

The porous organic/inorganic hybrid nano-particles can be formed by hydrolysis and condensation of a silane compound with a structural regulator in water and a solvent.

The reaction condition for hydrolysis and condensation is not specifically limited, but it is preferable to induce the reaction at 30-100° C. with stirring for 1-40 hours. The reaction temperature is either maintained at the same temperature, or intermittently or serially regulated.

The hydrolysis and condensation can be induced under normal pressure but is preferably induced by increasing the pressure to prepare porous particles with a lower refractive index. Moreover, the particles are clearer and have better dispersibility than those prepared by other methods. In general, it is preferred to induce the reaction in an air-tight reactor at a temperature 5-70° C. higher than the boiling point of the organic solvent. If the temperature is less than 5° C. higher than the boiling point of the organic solvent, the pressure is not great enough for the reaction. On the contrary, if the reaction temperature is at least 70° C. higher than the boiling point of the solvent, the pressure becomes too high to form particles stably.

As explained hereinbefore, after forming porous organic/inorganic hybrid nano-particles at regular sizes by hydrolysis and condensation and further increasing their sizes, the structural regulator used for the growth of the porous particles is eliminated, resulting in the final porous organic/inorganic hybrid nano-particles.

To eliminate the structural regulator, an ion exchange resin column, ultra-filtration, or water washing is used. Among these methods, the water-washing method is most convenient.

It is preferable to use enough of the porous nano-particles of a) prepared in the above to lower the refractive index. For example, the porous hybrid nano-particles do not decrease refractive index linearly according to their content in a film composition, but rather the refractive index reduces rapidly with an increase in the content.

If necessary, from the above porous organic/inorganic hybrid nano-particles, a specific solvent, water or alcohol is eliminated or the solvent is substituted or a byproduct is eliminated after the substitution of the secondary solvent to prepare the final porous organic/inorganic hybrid nano-particles.

When it is applied to a coating composition, the porous organic/inorganic hybrid nano-particles prepared above do not include a structural regulator. At this time, the porous organic/inorganic hybrid nano-particles are included in the coating composition as the particles themselves or as a colloid in which the particles are dispersed in solvent. The coating composition is then applied to a film with an extra-low refractive index prepared at a low temperature of up to 120° C.

The porous organic/inorganic hybrid nano-particles do not reduce the refractive index linearly according to their content in the composition of a film, and particularly when they are used over a specified amount, the refractive index suddenly decreases. Therefore, more than a specified amount of the nano-particles is preferably added to the solid part of the coating composition.

Particularly, the preferable content of the porous nano-particles in the solid part of the coating composition for film is at least 60 weight %, and at least 70 weight % is more preferable. At this time, the refractive index decreases rapidly so as to produce a photocurable film with an extremely low refractive index of up to 1.40 or even 1.35.

According to the present invention, the photocurable compound having unsaturated functional groups of b) is preferably one of the photocurable compounds having ethylenically unsaturated binding, enabling photopolymerization for hard coating. Particularly, the photocurable compound of the invention is exemplified by compounds prepared by the etherification of polyhydric alcohol such as ethyleneglycol di(metha)acrylate, polyethyleneglycol di(metha)acrylate having 2~14 ethylene groups, trimethylolpropane tri(metha)acrylate, pentaerythritol tri(metha)acrylate, pentaerythritol tetra(metha)acrylate, propyleneglycol di(metha)acrylate having 2~14 propylene groups, dipentaerythritol penta(metha)acrylate, and dipentaerythritol hexa(metha)acrylate in $\alpha,\beta$-unsaturated carboxylic acid; compounds prepared by adding (metha)acrylic acid to those compounds containing glycidyl group such as trimethylolpropane triglycidyletheracrylic acid additive and bisphenol A diglycidyletheracrylic acid additive; compounds prepared by esterification of those compounds having hydroxyl group of toluene diisocyanate additive of phthalic acid ester of $\beta$-hydroxy ethyl(metha)acrylate or ethylenically unsaturated binding with polyhydric carboxylic acid or polyisocyanate additive; ester compound prepared by estherification of a compound having hydroxyl group or ethylenically unsaturated binding of toluene diisocyanate additive of $\beta$-hydroxy ethyl(metha)acrylate with polyhydric carboxylic acid or polyisocyanate additive; or (metha)acrylic acid alkylester such as methyl(metha)acrylate, ethyl(metha)acrylate, butyl(metha)acrylate, 2-ethylhexyl(metha)acrylate.

The photocurable compound having unsaturated functional groups can be mixed with monofunctional acrylate compound having ethylenically unsaturated binding, styrene or vinyl toluene, if necessary.

The photoinitiator or photosensitizer of b) of the present invention is used for photocuration. The photoinitiator is exemplified by acetophenones, benzophenones, Michler benzoilbenzoate, $\alpha$-amyloximeester or tioxantons. The photosensitizer is exemplified by n-butylamine, triethylamine or tri-n-butylphosphine.

The photoinitiator or the photosensitizer can be added singly or together and the co-application of the two results in a better photocurable effect.

The organic siloxane thermosetting compound of b) of the present invention is not limited to a specific compound as long as it has excellent light-resistance, moisture-resistance and adhesion to a substrate even when a substrate has already been adhered to another layer. Particularly, it is preferable to use organic siloxane thermosetting compound in order to secure excellent film strength during the process of application on a plastic substrate or film, and hardening the film quickly at low temperature to obtain a display film with a low refractive index and low reflection.

The organic siloxane thermosetting compound of the present invention can be prepared by hydrolysis and condensation of one or more organo silane compounds in the presence of an acidic or basic catalyst. In particular, to produce a display film with a low refractive index, one or more fluorosilane compounds are mixed, followed by hydrolysis and condensation, resulting in a display film having excellent fouling-resistance and a low refractive index.

The organo silane compound is exemplified by tetraalkoxysilanes such as tetram-ethoxysilane, tetraethoxysilane, tetra-n-propoxysilane, tetra-i-propoxysilane or tetra-n-butoxysilane; trialkoxysilanes such as methyltrimethoxysilane, methyltri-ethoxysilane, methyltriphenoxysilane, ethyltrimethoxysilane, ethyltriethoxysilane, ethyltriphenoxysilane, n-propyltrimethoxysilane, n-propyltriethoxysilane, n-propyltriphenoxysilane, i-propyltrimethoxysilane, i-propyltriethoxysilane or i-propyltriphenoxysilane; dialkoxysilanes such as dimethyldimethoxysilane or dimethylethoxysilane; glycidoxyalkylalkoxysilanes such as 3-glycidoxyprop yltrimethoxysilane or 3-glycidoxypropyltriethoxysilane; epoxyalkylalkoxysilanes such as 5,6-epoxyhexyltriethoxysilane, 2-(3,4-epoxycyclohexyl)ethyltrimethoxysilane or 2-(3,4-epoxycyclohexyl)ethyltriethoxysilane; isocyanatealkylalkoxysilanes such as 3-isocyanatepropyltrimethoxysilane or 3-isocyanatepropyltriethoxysilane; or fluo-roalkylsilanes such as trifluoropropyltrimethoxysilane, trifluoropropyltriethoxysilane or tridecafluorotetrahydrooctyltriethoxysilane.

The organic siloxane thermosetting compound can include a copolymer of flu-orosilane and a general silane compound.

The coating composition for film composed of the above compounds contains a solvent of c) which is not limited as long as it can disperse the porous organic/inorganic hybrid nano-particles evenly and has an excellent coating capacity.

According to the present invention, the solvent can be a mixture of two or more of the same solvents used for the production of the porous organic/inorganic hybrid nano-particles of a) or can be substituted with another solvent or a mixture of two or more different solvents. For example, one or more solvents selected from a group consisting of aliphatic hydrocarbon solvents, alcohol solvents, ether solvents, ester solvents or amide solvents can be used singly or as a mixture.

The coating composition for film of the present invention can additionally include additives.

The kind and dosage of the additive is not limited as long as it does not affect the film properties. Particularly, conductive inorganic particles, salts or conductive polymers can be additionally included to promote an antistatic property. Especially, the coating composition for photocurable film can additionally include a fluorine-containing silane compound or fluorine-containing photopolymerizable compound to improve fouling resistance and/or a silane compound or silica particles to improve the strength of the film.

The present invention provides a method for preparing a film with low refractive index by applying the coating composition for photocurable film or thermosetting film on a substrate and hardening thereof and a film with a low refractive index prepared thereby. The film with low refractive index of the present invention has a significantly reduced refractive index of up to 1.40 and even 1.35, compared with the conventional film having a refractive index at least 1.45.

The substrate is one of the conventional transparent substrates, which is exemplified by glass, polycarbonate, acrylic resin, plastic sheet such as PET or TAC, plastic film, plastic lens or plastic panel.

A method for applying the coating composition for film with a low refractive index on a substrate is not specifically limited and can be modified according to the characteristics of the coating solution and coating amount. Generally the method for coating is exemplified by roll coating, gravure coating, dip coating, bar coating, spray coating, spin coating and extrusion coating.

It is possible to form additional layers on and under the film with a low refractive index of the present invention to enhance its functions. For example, an adhesive layer to endow an adhesive property; a primer layer; or other layers to endow such functions as an antistatic property, abrasion resistance and fouling resistance can be additionally included, and if necessary a functional additive can be added.

The film with a low refractive index of the present invention can be applied to various displays such as word-processor, computer, television or plasma display panels; the surface of a polarizer used for LCD; optical lenses including clear plastic lenses of sun-glasses, degree-lenses of glasses or finder lenses for cameras; film with low reflection adhered onto the covers of various gauges or glass surfaces of automobiles or electric cars; brightness-enhancing film; or optical waveguide film.

The film prepared by the coating composition for film with a low refractive index of the present invention not only can be produced by a simple procedure but also has excellent transparency and a remarkably low refractive index, compared with conventional photocurable or thermosetting resins, making it a promising candidate for film with a low refractive index and film with low reflection for various uses.

Practical and presently preferred embodiments of the present invention are illustrated as shown in the following Examples.

However, it will be appreciated that those skilled in the art, on consideration of this disclosure, may make modifications and improvements within the spirit and scope of the present invention.

EXAMPLES

Preparation of a Coating Composition for Photocurable Film

Example 1

34 g of methyltrimethoxysilane (MTMS), 52 g of tetraethoxysilane (TEOS) and 161 g of ethanol (EtOH) were mixed, followed by stirring at room temperature. To the mixture was added 102 g of 10 weight % tetrapropyl ammonium hydroxide solution (TPAOH) diluted with 66 g of distilled water. After mixing completely, the temperature of the mixture was raised to 80° C. and the reaction was induced for 20 hours at the temperature to prepare a transparent silicate solution. The silicate solution was cooled down at room temperature, and then the temperature was further lowered in a 0° C. ice-bath. 6.4 g of 65 weight % aqueous nitric acid ($HNO_3$) was added, followed by stirring for 30 minutes. The resultant solution was diluted with ether solvent.

The diluted solution was washed with distilled water to eliminate byproducts. The solvent was substituted with propyleneglycolmethyletheracetate (PGMEA) by using a rotary evaporator, resulting in 212 g of colloid in which 15 weight % of porous organic/inorganic hybrid nano-particles are dispersed. The solution with the dispersed nano-particles was completely transparent and the refractive index of the film dried using the nano-particles was 1.269.

4.7 g of the colloid with 15 weight % dispersed porous organic/inorganic hybrid nano-particles and 2.0 g of propyleneglycolmethyletheracetate solution containing 15 weight % pentaerythritoltetraacrylate (PETA) were mixed, to which 60 mg of 2,2-dimethoxy-2-phenyl-acetophenone was added to give a coating composition for film with a low refractive index.

Example 2

212 g of colloid with dispersed porous organic/inorganic hybrid nano-particles was prepared in the same manner as described in the above Example 1 except that 81 g of 10 weight % tetra propyl ammonium hydroxide solution diluted with 84 g of distilled water was used, followed by reaction at 70° C., and 5.1 g of 65 weight % aqueous nitric acid was used therein. The solution containing nano-particles was completely transparent and the refractive index of the film dried using the nano-particles was 1.263.

5.3 g of the colloid with 15 weight % dispersed porous organic/inorganic hybrid nano-particles and 1.3 g of propyleneglycolmethyletheracetate solution containing 15 weight % pentaerythritoltetraacrylate (PETA) were mixed, to which 40 mg of 2,2-dimethoxy-2-phenyl-acetophenone was added to give a coating composition for film with a low refractive index.

Example 3

212 g of colloid with the dispersed porous organic/inorganic hybrid nano-particles was prepared in the same manner as described in the above Example 1 except that 122 g of 10 weight % tetra propyl ammonium hydroxide solution diluted with 48 g of distilled water was used, followed by hydrothermal reaction for 12 hours at 90° C., and 7.6 g of 65 weight % aqueous nitric acid was used therein. The solution with the dispersed nano-particles was completely transparent and the refractive index of the film dried using the nano-particles was 1.234.

4.7 g of the colloid with 15 weight % dispersed porous organic/inorganic hybrid nano-particles and 2.0 g of propyleneglycolmethyletheracetate solution containing 15 weight % dipentaerythritolhexaacrylate (DPHA) were mixed, to which 60 mg of 2,2-dimethoxy-2-phenyl-acetophenone was added to give a coating composition for film with a low refractive index.

Example 4

215 g of colloid with the dispersed porous organic/inorganic hybrid nano-particles was prepared in the same manner as described in Example 1 except that 45 g of methyltrimethoxysilane, 35 g of tetraethoxysilane and 81 g of 10 weight % tetra propyl ammonium hydroxide solution diluted with 77 g of distilled water were reacted at 60° C. and 3.6 g of 65 weight % aqueous nitric acid was used therein. The solution with the dispersed nano-particles was completely transparent and the refractive index of the film dried using the nano-particles was 1.274.

4.7 g of the colloid with 15 weight % dispersed porous organic/inorganic hybrid nano-particles and 2.0 g of propyleneglycolmethyletheracetate solution containing 15 weight % dipentaerythritolhexaacrylate (DPHA) were mixed, to which 60 mg of 2,2-dimethoxy-2-phenyl-acetophenone was added to give a coating composition for film with a low refractive index.

Example 5

209 g of colloid with the dispersed porous organic/inorganic hybrid nano-particles was prepared in the same manner as described in Example 1 except that 27 g of methyltrimethoxysilane, 63 g of tetraethoxysilane and 102 g of 10 weight % tetra propyl ammonium hydroxide solution diluted with 70.5 g of distilled water were used therein. The solution with the dispersed nano-particles was completely transparent and the refractive index of the film dried using the nano-particles was 1.288.

5.0 g of the colloid with 15 weight % dispersed porous organic/inorganic hybrid nano-particles and 1.7 g of propyleneglycolmethyletheracetate solution containing 15 weight % dipentaerythritoltetraacrylate (PETA) were mixed, to which 50 mg of 2,2-dimethoxy-2-phenyl-acetophenone was added to give a coating composition for film with a low refractive index.

Example 6

104 g of tetraethoxysilane (TEOS) and 184 g of ethanol (EtOH) were mixed and stirred at room temperature. To the mixture was added 61 g of 25 weight % tetra propyl ammonium hydroxide solution (TPAOH) diluted with 98 g of distilled water. After mixing completely, the temperature of the mixture was raised to 80° C. and the reaction was induced for 30 hours at the temperature to prepare a transparent silicate solution. The silicate solution was cooled down at room temperature, and then the temperature was further lowered in a 0° C. ice-bath. 9.5 g of 65 weight % aqueous nitric acid ($HNO_3$) was added, followed by stirring for 30 minutes. The resultant solution was diluted with water and ethanol solvent.

The diluted solution was filtered by an ultra-filtration membrane to eliminate the structural regulator, and the solvent used therein was substituted with ethanol, resulting in 200 g of colloid with 15 weight % dispersed porous organic/inorganic hybrid nano-particles. The solution with the dispersed nano-particles was completely transparent and the refractive index of the film dried using the nano-particles was 1.295.

5.3 g of colloid with 15 weight % dispersed porous organic/inorganic hybrid nano-particles was mixed with 1.3 g of propyleneglycolmethyletheracetate solution in which 15 weight % pentaerythritoltetraacrylate and 1H, 1H,6H,6H-perfluoro-1,6-hexanediol diacrylate were dissolved at the weight ratio of 7:3, then 40 mg of 2,2-dimethoxy-2-phenyl-acetophenone was added to give a coating composition for film with a low refractive index.

Example 7

A coating composition for film with low refractive index was prepared in the same manner as described in Example 2 except pentaerythritoltetraacrylate (PETA) and 1H, 1H,6H, 6H-perfluoro-1,6-hexanediol diacrylate were mixed at the weight ratio of 7:3 instead of 15 weight % pentaerythritoltetraacrylate.

Comparative Example 1

2.0 g of 15 weight % hybrid siloxane resin-dispersed solution was prepared in the same manner as described in Example 1 except that 64 g of 10 weight % tetra propyl ammonium hydroxide solution diluted with 119 g of distilled water was used for the reaction at 60° C. and then 15.9 g of 65 weight % aqueous nitric acid was used. To the solution was added 4.7 g of propyleneglycolmethyletheracetate solution containing 15 weight % pentaerythritoltetraacrylate. A coating composition for photocurable film was prepared in the same manner as described in Example 1 except that 140 mg of 2,2-dimethoxy-2-phenyl-2-acetophenoe was added.

Comparative Example 2

A coating composition for photocurable film was prepared in the same manner as described in Example 7 except that 5.3 g of 15 weight % hybrid siloxane resin-dispersed solution prepared in the above Comparative Example 1 was used.

Comparative Example 3

150 mg of 2,2-dimethoxy-2-phenyl-acetophenone was added to 5.0 g of propyleneglycolmethyletheracetate solution containing 15 weight % dipentaerythritolhexaacrylate to give a coating composition for photocurable film.

Comparative Example 4

150 mg of 2,2-dimethoxy-2-phenyl-acetophenone was added to 5.0 g of 15 weight % propyleneglycolmethyletheracetate solution in which pentaerythritoltetraacrylate and 1H,1H,6H,6H-perfluoro-1,6-hexanediol diacrylate were mixed at the weight ratio of 7:3 to give a coating composition for photocurable film.

Preparation of a Coating Composition for Thermosetting Film

Example 8

34 g of methyltrimethoxysilane (MTMS), 52 g of tetraethoxysilane (TEOS) and 161 g of ethanol (EtOH) were mixed and stirred at room temperature. To the mixture was added 102 g of 10 weight % tetra propyl ammonium hydroxide solution (TPAOH) diluted with 66 g of distilled water. After mixing completely, the temperature of the mixture was raised to 80° C. and the reaction was induced for 20 hours at the temperature to prepare the transparent silicate solution. The silicate solution was cooled down at room temperature, and then the temperature was further lowered in a 0° C. ice-bath. 6.4 g of 65 weight % aqueous nitric acid ($HNO_3$) was added, followed by stirring for 30 minutes. The resultant solution was diluted with ether solvent.

The diluted solution was washed with distilled water to eliminate the structural regulator, and the solvent used therein was substituted with propyleneglycol-methyletheracetate (PGMEA) ethanol using a rotary evaporator, resulting in 212 g of colloid with 15 weight % dispersed porous organic/inorganic hybrid nano-particles. The solution with the dispersed nano-particles was completely transparent and the refractive index of the film dried using the nano-particles was 1.269.

And then 45 g of methyltriethoxysilane, 52 g of tetraethoxysilane and 147 g of propyleneglycolmethyletheracetate were mixed and stirred at room temperature. To the mixture was added 160 g of distilled water containing 485 mg of 65 weight % aqueous nitric acid. Upon complete mixing, the temperature of the mixture was raised to 60° C., at which the reaction was induced for 20 hours to prepare a transparent organic siloxane solution. The organic siloxane solution was cooled down at room temperature and the solvent was substituted with propyleneglycolmethyletheracetate (PGMEA) using a rotary evaporator, resulting in 150 g of 20 weight % organic siloxane coating solution.

5 g of colloid with the dispersed porous organic/inorganic hybrid nano-particles was mixed with 1.25 g of the organic siloxane coating solution to give a coating solution for a thermosetting film.

Example 9

209 g of colloid with dispersed porous organic/inorganic hybrid nano-particles was prepared in the same manner as described in Example 8 except that 27 g of methyltrimethoxysilane, 63 g of tetraethoxysilane and 102 g of 10 weight % tetra propyl ammonium hydroxide solution diluted with 70.5 g of distilled water were mixed for the reaction at 60° C. and 5.1 g of 65 weight % aqueous nitric acid was used. The solution with the dispersed nano-particles was completely transparent and the refractive index of the film dried using the nano-particles was 1.288.

And then 26 g of tridecafluoro-1,1,2,2-tetrahydro-octyl) triethoxysilane, 9 g of methyltrimethoxysilane, 42 g of tetraethoxysilane and 97 g of ethanol were mixed and stirred at room temperature. To the mixture was added 65 weight % aqueous nitric acid (0.3 g of aqueous nitric acid was diluted with 99 g of distilled water). Upon complete mixing, the temperature of the mixture was raised to 60° C., at which the reaction was induced for 20 hours to prepare a transparent organic siloxane solution. The solvent was substituted with propyleneglycolmethyletheracetate (PGMEA) using a rotary evaporator, resulting in 233 g of 15 weight % organic siloxane coating solution.

4 g of colloid with the dispersed porous organic/inorganic hybrid nano-particles was mixed with 2.67 g of the organic siloxane coating solution to give a coating solution for a thermosetting film.

Example 10

104 g of tetraethoxysilane (TEOS) and 184 g of ethanol (EtOH) were mixed, followed by stirring at room temperature. To the mixture was added 61 g of 25 weight % tetrapropyl ammonium hydroxide solution (TPAOH) diluted with 98 g of distilled water. After mixing completely, the temperature of the mixture was raised to 80° C. and the reaction was induced for 30 hours at the temperature to prepare a transparent silicate solution. The silicate solution was cooled down at room temperature, and then the temperature was further lowered in a 0° C. ice-bath. 9.5 g of 65 weight % aqueous nitric acid ($HNO_3$) was added, followed by stirring for 30 minutes. The resultant solution was diluted with water and ethanol solvent.

The diluted solution was filtered by an ultra-filtration membrane to eliminate the structural regulator, and the solvent used therein was substituted with ethanol, resulting in 200 g of colloid with 15 weight % dispersed porous organic/inorganic hybrid nano-particles. The solution with the dispersed nano-particles was completely transparent and the refractive index of the film dried using the nano-particles was 1.295.

And then 26 g of tridecafluoro-1,1,2,2-tetrahydro-octyl) triethoxysilane, 9 g of methyltrimethoxysilane, 42 g of tetraethoxysilane and 97 g of ethanol were mixed and stirred at room temperature. To the mixture was added 65 weight % aqueous nitric acid (0.3 g of aqueous nitric acid was diluted with 99 g of distilled water). Upon complete mixing, the temperature of the mixture was raised to 60° C., at which the reaction was induced for 20 hours to prepare a transparent organic siloxane solution. The solvent was substituted with propyleneglycolmethyletheracetate (PGMEA) using a rotary evaporator, resulting in 233 g of 15 weight % organic siloxane coating solution.

4 g of colloid with the dispersed porous organic/inorganic hybrid nano-particles was mixed with 2.67 g of the organic siloxane coating solution to give a coating solution for thermosetting film.

Comparative Example 5

45 g of methyltriethoxysilane, 52 g of tetraethoxysilane and 147 g of propyleneglycolmethyletheracetate were mixed and stirred at room temperature. To the mixture was added 160 g of distilled water containing 485 mg of 65 weight % aqueous nitric acid. Upon complete mixing, the temperature of the mixture was raised to 60° C., at which the reaction was induced for 20 hours to prepare a transparent organic siloxane solution. The solvent was substituted with propyleneglycolmethyletheracetate (PGMEA) using a rotary evaporator, resulting in 159 g of 20 weight % organic siloxane coating solution.

Comparative Example 6

34 g of methyltrimethoxysilane, 52 g of tetraethoxysilane and 161 g of ethanol were mixed, followed by stirring at room temperature. To the mixture was added 102 g of 10 weight % tetra propyl ammonium hydroxide solution diluted with 66 g of distilled water. After mixing completely, the temperature of the mixture was raised to 80° C. and the reaction was induced for 20 hours at the temperature to prepare a transparent silicate solution. The silicate solution was cooled down at room temperature, and then the temperature was further lowered in a 0° C. ice-bath. 4.5 g of 65 weight % aqueous nitric acid ($HNO_3$) was added thereto, followed by stirring for 30 minutes. The resultant solution was diluted with ether solvent. The solvent was substituted with propyleneglycolmethyletheracetate (PGMEA) using a rotary evaporator, resulting in 212 g of silicate coating solution.

Comparative Example 7

3 g of the organic siloxane coating solution prepared in the above Comparative Example 5 and 2.7 g of the silicate coating solution prepared in the above Comparative Example 6 were mixed to prepare the final coating composition.

Comparative Example 8

26 g of tridecafluoro-1,1,2,2-tetrahydro-octyl)triethoxysilane, 9 g of methyltri-ethoxysilane, 42 g of tetraethoxysilane and 97 g of ethanol were mixed, followed by stirring at room temperature. To the mixture was added 0.3 g of 65 weight % aqueous nitric acid ($HNO_3$) diluted with 99 g of distilled water. After mixing completely, the temperature of the mixture was raised to 60° C. and the reaction was induced for 20 hours at the temperature to prepare a transparent silicate solution. The solvent was substituted with propyleneglycolmethyletheracetate (PGMEA) using a rotary evaporator, resulting in 233 g of 15 weight % organic siloxane coating solution.

Properties of the Coating Compositions for Photocurable Film

The refractive index, mechanical strength and minimum reflectance of the coating compositions prepared in Examples 1-7 and Comparative Examples 1-4 were investigated. And the results are shown in Table 1.

i) Refractive index—Coating compositions prepared in Examples 1-7 and Comparative Examples 1-4 were applied to a silicon wafer by spin coating at 2,000 rpm, followed by baking at 80° C. for 90 seconds and then irradiated with 200 mJ/☐ under high-pressure mercury lamp. After baking at 100° C. for 30 minutes, the refractive index of the film was measured by using an ellipsometer.

ii) Mechanical strength—The strength of each film coated with the coating compositions prepared in Examples 1-7 and Comparative Examples 1-4 was measured by using a nano indentor.

iii) Minimum reflectance (low reflective property of film with low refractive index)—TAC film was coated with the coating compositions prepared in Examples 1-7 and Comparative Examples 1-4 respectively by using a wire bar, followed by hardening. After preparing the reflection-preventive film, the minimum reflectance of visible light was measured by using a spectral reflectance measuring apparatus. More than 2.5% reflectance was considered as insufficient, 1.5-2.5% was considered as good and less than 1.5% was regarded as excellent.

TABLE 1

| | Refractive Index | Film Strength (GPa) | Minimum Reflectance |
|---|---|---|---|
| Example 1 | 1.391 | 0.50 | Good |
| Example 2 | 1.341 | 0.43 | Excellent |
| Example 3 | 1.385 | 0.49 | Good |
| Example 4 | 1.351 | 0.38 | Excellent |
| Example 5 | 1.378 | 0.65 | Good |
| Example 6 | 1.349 | 0.82 | Excellent |
| Example 7 | 1.317 | 0.41 | Excellent |
| Comparative Example 1 | 1.480 | 0.43 | Insufficient |
| Comparative Example 2 | 1.475 | 1.10 | Insufficient |
| Comparative Example 3 | 1.528 | 0.40 | Insufficient |
| Comparative Example 4 | 1.531 | 0.40 | Insufficient |

Properties of Coating Compositions for Thermosetting Film

The refractive index, film strength and minimum reflectance of the coating compositions prepared in Examples 8-10 and Comparative Examples 5-8 were measured and the results are shown in Table 2.

i) Refractive index and strength—The coating compositions prepared in Examples 8-10 and Comparative Examples 5-8 were applied to a silicon wafer by spin coating, followed by baking at 80° C. for 90 seconds and then at 100° C. for one hour. The refractive index and strength were measured by using an ellipsometer and a nano indentor.

ii) Minimum reflectance—TAC film was coated with the coating compositions prepared in Examples 8-10 and Comparative Examples 5-8 respectively by using wire bar, followed by hardening at 100° C. for 1 hour. After preparing a reflection-preventive film, the minimum reflectance of visible light was measured by using a spectral reflectance measuring apparatus. More than 2.5% reflectance was considered as insufficient, 1.5-2.5% was considered as good and less than 1.5% was regarded as excellent.

In the meantime, the low reflective property of the film with a low refractive index prepared in Comparative Example 5 was measured in the same manner as described in the above except that the coating composition was applied on a substrate, followed by baking, which was irradiated with 200 mJ/cm² before further baking at 100° C. for 30 minutes.

TABLE 2

| | Refractive Index | Film Strength (GPa) | Minimum Reflectance |
|---|---|---|---|
| Example 8 | 1.345 | 1.02 | Excellent |
| Example 9 | 1.360 | 1.35 | Good |
| Example 10 | 1.370 | 1.50 | Good |
| Comparative Example 5 | 1.420 | 1.61 | Insufficient |
| Comparative Example 6 | 1.289 | 0.53 | Excellent |
| Comparative Example 7 | 1.430 | 1.25 | Insufficient |
| Comparative Example 8 | 1.410 | 1.45 | Insufficient |

As shown in Table 1 and Table 2, the refractive index of each photocurable resin film prepared by using coating compositions prepared in Examples 1-7 of the invention was significantly low, compared with those of films prepared in Comparative Examples 1-4, and the low reflection properties of those were also very excellent. The refractive index of each thermosetting resin film prepared by using coating compositions prepared in Examples 8-10 was also very low, compared with those of Comparative Examples 5-8, and the low reflection property thereof was also excellent. Besides, the film prepared by the coating composition of the invention not only can be prepared at low temperature but also has excellent strength. The nano-particle content-depending refractive index was also investigated and the results are shown in FIG. 1. As shown in FIG. 1, when the nano-particle content is at least 60 weight % of the total solid content part of the coating composition for film, and more preferably, when the nano-particle content is at least 70 weight %, the refractive index is significantly lowered. Thus, it has been confirmed that at least a specific amount of nano-particles contributes to lowering the refractive index.

INDUSTRIAL APPLICABILITY

According to the present invention, a coating composition for film with low refractive index or low reflectance can be prepared by the following processes; forming porous particles in a silane compound at a specific size by adding a structural regulator thereto; eliminating the structural regulator from the compound by a simple method, resulting in porous organic/inorganic hybrid nano-particles; and preparing a film with low refractive index or low reflectance by using the nano-particles at a low temperature of up to 120° C. Thus, the coating composition of the present invention can be effectively applied to film with a low refractive index or low reflectance for various uses including displays.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A coating composition for a film with low refractive index characteristically containing:
   a) porous organic/inorganic hybrid nano-particles having an average diameter of 5-30 nm and a maximum C/Si ratio of 0.65;
   b) a photocurable compound containing unsaturated functional groups and photoinitiator or photosensitizer; or organic siloxane thermosetting compound; and
   c) a solvent,
   wherein the porous organic/inorganic hybrid nano-particles of a) are prepared by the hydrolysis and condensation of the mixture of i) a silane compound, ii) a structural regulator, iii) water and iv) a solvent, producing porous nano-particles 5-30 nm in diameter on average and eliminating the structural regulator from the produced porous nano-particles having a 5-30 nm diameter on average, and
   the silane compound of i) is a mixture of a silane compound represented by Formula 1 and a silane compound represented by Formula 2, and the maximum C/Si ratio of the silane compound Formula 2 for 1 mole of the silane compound of Formula 1 is 0.65:

$SiR^1_1R^2_3$      [Formula 1]

$SiR^3_4$      [Formula 2]

wherein $R^1$ is a non-hydrolyzable functional group which is H, F, aryl, vinyl, allyl, or unsubstituted or F-substituted $C_1$-$C_4$ straight or branched alkyl, preferably unsubstituted or F-substituted $C_1$-$C_4$ straight or branched alkyl, $R^2$ and $R^3$ are independently acetoxy, hydroxy, or $C_1$-$C_4$ straight or branched alkoxy.

2. The coating composition for a film with low refractive index according to claim 1, wherein the content of the porous organic/inorganic hybrid nano-particles of a) is at least 60 weight % of the total part of the coating composition.

3. The coating composition for a film with low refractive index according to claim 1, wherein one or more structural regulators are selected from a group consisting of such alkyl ammonium hydroxides as tetra methyl ammonium hydroxide, tetra ethyl ammonium hydroxide, tetra propyl alkyl ammonium hydroxide, and tetra butyl ammonium hydroxide.

4. The coating composition for a film with low refractive index according to claim 1, wherein the structural regulator includes 0.05-0.25 mol to 1 mol of the silane compound.

5. The coating composition for a film with low refractive index according to claim 1, wherein the temperature for hydrolysis and condensation is 30-100° C. or 5-70° C. higher than the boiling point of the solvent.

6. The coating composition for a film with low refractive index according to claim 1, wherein the structural regulator is eliminated by ion exchange resin, ultra-filtration, or water washing.

7. The coating composition for a film with low refractive index according to claim 1, wherein the photocurable compound containing unsaturated functional groups of b) is one or more compounds selected from a group consisting of ethyleneglycol di(metha)acrylate, polyethyleneglycol di(metha)acrylate having 2-14 ethylene groups, trimethylolpropanetri(metha)acrylate, pentaerythriotol tri(metha)acrylate, pentaerythritol tetra(metha)acrylate, propyleneglycoldi(metha)acrylate having 2-14 propylene groups, dipentaerythritol penta(metha)acrylate, compounds prepared by estherification of polyhydric alcohol of dipentaerythritol hexa(metha)acrylate with α,β-unsaturated carboxylic acid, compounds prepared by adding (metha)acrylic acid to those compounds containing glycidyl group of trimethyloipropane triglycidyletheracrylic acid additive, compounds prepared by adding (metha)acrylic acid to those compounds having glycidyl group of bisphenol A-diglycidyletheracrylic acid additive, ester compound prepared by estherification of a compound having hydroxyl group or ethylenically unsaturated binding of toluene diisocyanate additive of β-hydroxy ethyl (metha)acrylate phthalic acid ester with polyhydric carboxylic acid or polyisocyanate additive, ester compound prepared by estherification of a compound having hydroxyl group or ethylenically unsaturated binding of toluene diisocyanate additive of β-hydroxy ethyl(metha)acrylate with polyhydric carboxylic acid or polyisocyanate additive, methyl(metha) acrylate, ethyl(metha)acrylate, butyl(metha)acrylate, and (metha)acrylic acid alkylester of 2-ethylhexyl(metha)acrylate.

8. The coating composition for a film with low refractive index according to claim 1, wherein the photoinitiator of b) is one of acetophonones, benzophenones, Michler benzoilbenzoate, α-amyloximeester or tioxantons, and the photosensitizer is one of n-butylamine, triethylamine or tri-n-butylphosphine.

9. The coating composition for a film with low refractive index according to claim 1, wherein the organic siloxane thermosetting compound of b) is characteristically prepared by hydrolysis and condensation of organo silane compound in the presence of an acidic or basic catalyst.

10. The coating composition for a film with low refractive index according to claim 9, wherein the organo silane compound is one or more compounds selected from a group consisting of tetramethoxysilane, tetraethoxysilane, tetra-n-propoxysilane, tetra-i-propoxysilane, tetra-n-butoxysilane, methyltrimethoxysilane, methyltriethoxysilane, methyltriphenoxysilane, ethyltrimethoxysilane, ethyltriethoxysilane, ethyltriphenoxysilane, n-propyltrimethoxysilane, n-propyltriethoxysilane, n-propyltriphenoxysilane, i-propyltrimethoxysilane, i-propyltriethoxysilane, i-propyltriphenoxysilane, dimethyldimethoxysilane, dimethylethoxysilane, 3-glycidoxypropyltrimethoxysilane, 3-glycidoxypropyltriethoxysilane, 5,6-epoxyhexyltriethoxysilane, 2-(3,4-epoxycyclohexyl)ethyltrimethoxysilane, 2-(3,4-epoxycyclohexyl)ethyltriethoxysilane, 3-iso cyanatepropyltrimethoxysilane, 3-isocyanatepropyltriethoxysilane, trifluoropropyltrimethoxysilane, trifluoropropyltriethoxysilane, and tridecafluorotetrahydrooctyltriethoxysilane.

11. The coating composition for a film with low refractive index according to claim 1, wherein the organic siloxane thermosetting compound of b) is the copolymer of a fluorosilane and a general silane.

12. A preparation method for a film, which is characterized by the process of applying a substrate with the coating composition for a film of claim 1 and hardening thereof.

13. A film prepared by the method of claim 12.

14. The film according to claim 13, which has the refractive index up to 1.40.

15. The film according to claim 13, which can be applied to word-processor, computer, television or plasma display panels, the surface of a polarizer used for LCD, sunglass lenses, degree-lenses of glasses, finder lenses for cameras, covers of various gauges, automobile glass, electric car glass, brightness-enhancing film, or optical waveguide film.

* * * * *